United States Patent [19]

Hoffman

[11] 4,370,430
[45] Jan. 25, 1983

[54] HINDERED AMINE LIGHT STABILIZERS FOR POLYMERS

[75] Inventor: Joseph A. Hoffman, Bridgewater, N.J.

[73] Assignee: American Cyanamid Company, Stamford, Conn.

[21] Appl. No.: 297,681

[22] Filed: Aug. 31, 1981

[51] Int. Cl.$^3$ ............... C08K 5/35; C08K 5/34; C07D 413/12; C07D 401/12; C07D 211/06
[52] U.S. Cl. .................... 524/96; 524/99; 524/103; 544/129; 546/187; 546/186; 546/191
[58] Field of Search ............ 528/391; 260/45.8 NP, 260/45.8 NZ; 544/129; 546/187, 191, 186; 524/96, 99, 103

[56] References Cited

U.S. PATENT DOCUMENTS

| | | | |
|---|---|---|---|
| 3,480,635 | 11/1969 | Altwicker | 546/191 |
| 3,591,559 | 7/1971 | Kwolek | 528/391 |
| 4,104,248 | 8/1978 | Cantatore | 546/186 |
| 4,191,683 | 3/1980 | Brunetti et al. | 260/45.8 NP |
| 4,232,131 | 11/1980 | Rody et al. | 525/184 |

OTHER PUBLICATIONS

Imai et al, "Synthesis of Wholly Aromatic Polysulfonamides from Aromatic Chlorides and Aromatic Diamines", Journal of Polymer Science:Polymer Chemistry Edition, vol. 17, No. 5, (May), 1483–1491, (1979).
PCT International Publication No. WO 81/01706, published Jun. 25, 1981.
Hackh's Chem. Dictionary, 4th ed. (1969), p. 473.

Primary Examiner—V. P. Hoke
Attorney, Agent, or Firm—Steven J. Hultquist

[57] ABSTRACT

Oligomers of the formula

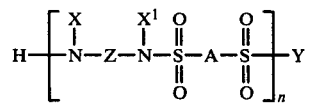

which contain at least one piperidyl radical per repeating unit are useful as light stabilizers for polymers.

13 Claims, No Drawings

HINDERED AMINE LIGHT STABILIZERS FOR POLYMERS

This invention relates to certain novel oligomers and to their use as light stabilizers for polymers. More particularly, it relates to novel oligomers of the formula (I)

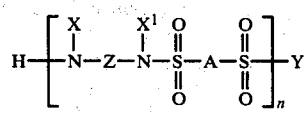

wherein X and $X^1$ are the same or different, and represent hydrogen, $C_1$-$C_{20}$ alkyl, or the radical (II)

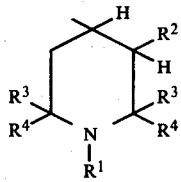

wherein $R^1$ represents hydrogen, $C_2$-$C_3$ hydroxyalkyl, $C_1$-$C_8$ alkyl, hydroxyl, or oxyl; $R^2$ represents hydrogen, $C_1$-$C_8$ alkyl, or benzyl; $R^3$ and $R^4$, which may be the same, or different, represent $C_1$-$C_8$ alkyl, benzyl, or phenethyl, or together with the carbon to which they are attached form a $C_5$-$C_{10}$ cycloalkyl. Z represents $C_2$-$C_{20}$ alkylene, either straight-chained or branched, wherein the alkylene chain may be interrupted by oxy, thio, or

radicals, wherein $R^5$ represents hydrogen, $C_1$-$C_{20}$ alkyl or the radical (II); $C_5$-$C_{10}$ cycloalkylene,

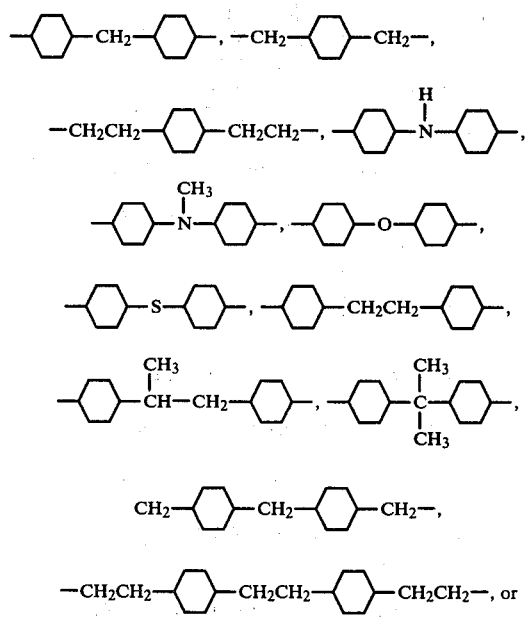

$C_6$-$C_{12}$ arylene, or $C_8$-$C_{16}$ aralkylene.

A is a $C_6$-$C_{12}$ arylene radical, or a substituted $C_6$-$C_{12}$ arylene wherein the substituents, which may be the same, or different, are $C_1$-$C_8$ alkyl, $C_1$-$C_8$ alkoxy, $C_1$-$C_8$ alkylamino, or di($C_1$-$C_8$)alkylamino.

n is an integer greater than 1 and less than 5.

Y represents halo, $C_1$-$C_8$ alkylamino, di($C_1$-$C_8$)alkylamino, piperidyl, pyrrolidyl, morpholino, or

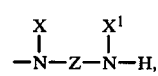

wherein X, $X^1$, and Z are as previously defined; with the proviso that at least one piperidinyl moiety of formula (II) is present in the repeating unit.

The preferred oligomers of formula (I) are those wherein X and $X^1$ are the moiety (II).

The especially preferred oligomers of formula (I) are those wherein X and $X^1$ are 2,2,6,6-tetramethyl-4-piperidinyl, Z is hexamethylene, and A is 1,3-phenylene.

The invention also relates to the use of such oligomers for stabilizing polymers, particularly polyolefins, against degradation by ultraviolet radiation, and to the stabilized compositions obtained thereby.

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles.

Rody and Rasberger, U.S. Pat. No. 4,232,131, disclose the stabilization of polymers against degradation by light by the use of oligomers prepared by reacting a dichloride of a dicarboxylic acid, such as adipoyl chloride, and a diamine containing a tetraalkylpiperidine moiety, such as 1,6-bis(2,2,6,6-tetramethyl-4-piperidinylamino)hexane. Since these oligomers have been found to be not completely satisfactory, research continues in order to find compounds, or combinations of compounds, which will be more satisfactory. The present invention arose out of such research and resulted in the discovery of the novel oligomers of formula (I) which provide improved light stability for polymers in mono and multifilaments.

The stabilizers of the present invention offer the following advantages:

(1) excellent light-stabilizing activity,
(2) excellent compatibility with resins,
(3) high resistance to gas fading,
(4) low extractability from polymers by laundering or dry cleaning, and
(5) excellent oven-aging stability.

The oligomers of formula (I) may be prepared by reacting essentially equal molecular proportions of a compound of formula (III)

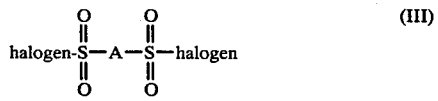

wherein A is as previously defined and halogen represents chloro, bromo, or fluoro, with a diamine of formula (IV)

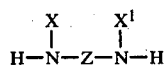

wherein X, X¹, and Z are as previously defined, in an inert solvent in the presence of an organic or inorganic base, at an elevated temperature, preferably at the boiling point of the solvent. Upon completion of the reaction, the reaction mixture may be filtered to separate by-product salts and the solvent may be evaporated from the filtrate to obtain a gummy residue which may be subsequently extracted in boiling petroleum ether, filtered, and recovered from the filtrate upon evaporation of the petroleum ether.

Optionally, the reaction may be carried out in a two-phase mixture of water and a water-immiscible inert solvent at a slightly elevated temperature in the presence of an organic or inorganic base. Upon completion of the reaction, the reaction mixture may be filtered to separate by-product salts, the organic phase recovered from the filtrate, and the solvent evaporated from the organic phase to obtain a gummy residue.

Preferably, the gummy residue obtained by either procedure is further reacted with an alkyl or aryl amine to minimize the halogen content of the residue. Suitable amines which may be used for this purpose include n-butylamine, n-hexylamine, n-octylamine, tert.-butylamine, morpholine, pyrrolidine, and the like.

The diamine of formula (IV) may be generally prepared by reductively alkylating a 4-oxopiperidine of formula (V) with an appropriate diamine of formula (VI) and hydrogen in the presence of a precious metal catalyst, such as platinum, as shown below.

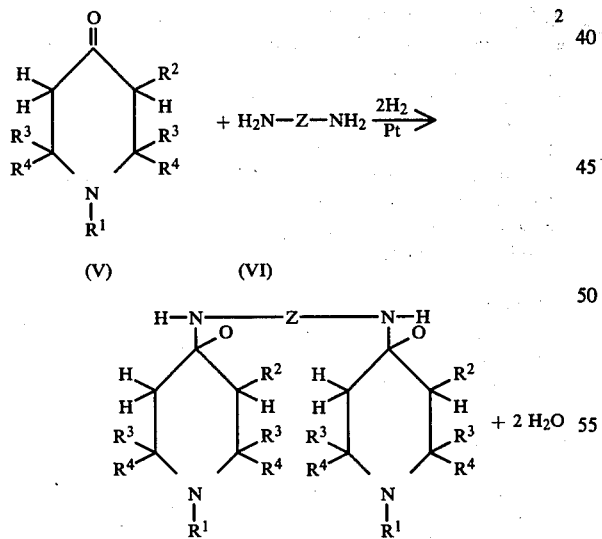

Suitable inert solvents include toluene, xylene, dioxane, and the like.

Suitable bases include sodium hydroxide, sodium carbonate, sodium bicarbonate, potassium hydroxide, potassium carbonate, potassium bicarbonate, triethylamine, tributylamine, and the like.

Illustrative examples of suitable compounds of formula (III) include the following:

1,3-benzenedisulfonyl dichloride,
1,3-benzenedisulfonyl dibromide,
1,4-benzenedisulfonyl dichloride,
1,3-benzenedisulfonyl difluoride,
4-methyl-1,3-benzenedisulfonyl dichloride,
3,5-dimethyl-1,4-benzenedisulfonyl dichloride,
2-methoxy-1,3-benzenedisulfonyl dichloride,
6-n-octyl-1,4-benzenedisulfonyl dichloride,
2-n-butylamino-1,3-benzenedisulfonyl dichloride,
6-diethylamino-1,4-benzenedisulfonyl dichloride,
2,6-naphthalenedisulfonyl dichloride,
1,6-naphthalenedisulfonyl dichloride,
1,7-naphthalenedisulfonyl dichloride,
4,6-dimethyl-1,3-benzenedisulfonyl dichloride,
4,5-dimethyl-1,3-benzenedisulfonyl dichloride,
2,4,6-trimethyl-1,3-benzenedisulfonyl dichloride,
4,4'-biphenyldisulfonyl dichloride, and the like.

The preferred compound of formula (III) is 1,3-benzenedisulfonyl dichloride.

Illustrative examples of suitable diamines of formula (IV) include the following:

4,4'-(dimethylenediimino)bis(2,2,6,6-tetramethylpiperidine),
4,4'-(tetramethylenediimino)bis(2,6-di-n-butyl-2,6-dimethylpiperidine),
4,4'-(hexamethylenediimino)bis(2,2,-6,6-tetramethylpiperidine),
4,4'-(thiodiethylenediimino)bis(2,2,-6,6-tetraethylpiperidine),
4,4'-(oxydihexamethylenediimino)bis-(2,2,6,6-tetramethylpiperidine),
4,4'-(hexamethylenediimino)bis(1,2,-2,6,6-pentamethylpiperidine),
4,4'-(hexamethylenediimino)bis(1-oxyl-2,2,6,6-tetramethylpiperidine),
4,4'-(hexamethylenediimino)bis(1-hydroxy-2,2,6,6-tetramethylpiperidine),
4,4'-(octadecamethylenediimino)bis-(2,2,6,6-tetramethylpiperidine),
4,4'-(iminodiethylenediimino)bis(2,2,-6,6-tetramethylpiperidine),
4,4'-(1,4-cyclohexylenediimino)bis-(2,2,6,6-tetramethylpiperidine),
4,4'-(methylenedi-4,1-cyclohexylenediimino)-bis(2,2,6,6-tetramethylpiperidine),
4,4'-[1,4-cyclohexylenebis(methyleneimino)]bis(2-benzyl-2,6,6-trimethylpiperidine),
15,15'-(hexamethylenediimino)bis(7-azadispiro[5.1.5.3]hexadecane),
4,4'-(1,4- phenylenediimino)bis(2,2,-6,6-tetramethylpiperidine),
4,4'-[1,4-phenylenedi(methyleneimino)]-bis(2,2,6,6-tetramethylpiperidine),
4,4'-(hexamethylenediimino)bis(2-phenethyl-2,6,6-trimethylpiperidine),
4,4'-(hexamethylenediimino)bis(2,2,3,-6,6-pentamethylpiperidine),
4-[(6-aminohexyl)amino]-2,2,6,6-tetramethylpiperidine,
4-[(12-aminododecyl)amino]-2,2,6,6-tetramethylpiperidine,
4-[bis(2-aminoethyl)amino]-2,2,6,6-tetramethylpiperidine,
4-[(4-aminocyclohexyl)amino]-2,2,3,-6,6-pentamethylpiperidine,
and the like.

The preferred diamine of formula (IV) is 4,4'-(hexamethylenediimino)bis(2,2,6,6-tetramethylpiperidine), also known as 1,6-bis(2,2,6,6-tetramethyl-4-piperidinylamino)hexane, and as N,N'-bis(2,2,6,6-tetramethyl-4piperidyl)hexamethylenediamine, the preparation of which is described in Example 2 of U.S. Pat. No. 4,104,248, incorporated herein by reference.

The oligomers of this invention are useful as light stabilizers for thermoplastic substrates such as polyolefins, polyesters, polyethers, polyurethanes, polystyrenes, high-impact polystyrenes, and the like. Preferably, the thermoplastic substrate is a polyolefin.

As used herein, the term "polyolefin" includes homopolymers of alpha olefins such as polyethylene, polypropylene, polybutadiene, polyisoprene, polystyrene, and the like, and, copolymers of alpha olefins such as ethylene-propylene copolymer, ethylene-butylene copolymer, ethylene-vinyl acetate copolymer, styrene-butadiene copolymer, acrylonitrile-butadiene-styrene terpolymer, and the like. The preferred polyolefin is a polypropylene.

Other organic materials susceptible to degradation by the effects of light, the properties of which are improved by the incorporation therein of an oligomer of this invention, include natural and synthetic rubbers; the latter include, for example, homo-, co-, and terpolymers of acrylonitrile, butadiene and styrene, and blends thereof.

The oligomers of the present invention are particularly useful as light stabilizers for polyolefin films, more particularly polypropylene films.

Generally, the compositions comprise a polymer substrate containing from about 0.1% to about 5% by weight of the oligomer of formula (I), based on the weight of the polymer substrate.

Preferably, the composition comprises a polyolefin containing from about 0.2% to about 2% by weight of the oligomer of formula (I), based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'-methylenebis(2,6-di-t-butylphenol); 4,4'-methylenebis(2,-6-diisopropylphenol); 2,4,6-tri-t-butylphenol; 2,2'-thiobis(4-methyl-6-t-butylphenol); octadecyl 2-(3',5'-di-t-butyl-4r'-hydroxyphenyl)propionate; 1,3,5-tris(4-tert.-butyl-3-hydroxy-2,6-dimethylbenzyl)-1,3,5-triazine-2,4,6-(1H,3H,5H)-trione; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythrityl diphosphite, diphenyldecyl phosphite, etc; and combinations thereof.

Suitable supplemental light stabilizers include those of the benzotriazole class, such as 2-(2'-hydroxy-5-t-octylphenyl)benzotriazole; 2-(2'-hydroxy-3',5'-ditbutylphenyl)-5-chlorobenzotriazole; those of the hydroxybenzophenone type, such as 2-hydroxy-4methoxybenzophenone; 2-hydroxy-4-octyloxybenzophenone; 2,2'-dihydroxy-4,4'-di-methoxybenzophenone; hindered phenol esters, such as n-hexadecyl 3,5-di-t-buty-4-hydroxybenzoate, and 2',4'-di-t-butylphenyl-3,5-di-t-butyl-4-hydroxybenzoate; metal complexes, such as nickel complexes of 2,2'-thiobis(4-t-octylphenol); nickel butylamine complex of 2,2'-thiobis (4-t-octylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc; nickel complex of 2-hydroxy-4methylphenyl undecyl ketone oxime, etc. Further illustrative examples of suitable antioxidants and supplemental light stabilizers can be found in columns 3 and 4 of U.S. Pat. Nos. 3,488,290 and 3,496,134, and in the other patents mentioned therein.

As with the oligomer of formula (I), the additive is advantageously employed within the range from about 0.2% to about 2% by weight, based on the weight of the untreated polymer.

The oligomer of formula (I) may be incorporated into the polymeric substrate by any of the known techniques for compounding additives with a polymer. For example, the oligomer of formula (I) and the additive may be compounded by dry blending with the substrate in powder or granular form, followed by milling, Banbury mixing, molding, casting, extruding, swelling, and the like. Alternatively, the oligomer of formula (I) may be added, as a solution or slurry in a suitable inert solvent, or dispersant, to the polymeric substrate in powder or granular form, the whole mixed intimately in a mixer, and the solvent subsequently removed. As a further possibility, the oligomer of formula (I) may be added to the polymeric substate during the preparation of the latter, for instance at the latex stage of polymer production, to provide prestabilized polymer material.

To incorporate the oligomer of formula (I) in multifilament fibers, the oligomer may be dry blended with the polymeric substrate and a processing antioxidant, and the blend extruded and pelletized at an elevated temperature. The pellets may then be re-extruded as multifilaments and spun into a yarn which is then drawn at an elevated temperature.

Optionally, the spun yarn may be treated with a processing lubricant. Preferably, the lubricant is an ethoxylated fatty acid, or an alkoxylated glycol.

The ethoxylated fatty acid lubricants have the general formula (VII):

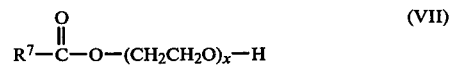

wherein $R^7$ is an alkyl group containing from about 12 to 20 carbon atoms and x is an integer of about 2 to 20. Such compounds include the polyethoxylated fatty acids, capric acid, lauric acid, myristic acid, palmitic acid, hexadecanoic acid, stearic acid, eicosanoic acid, and the like. The preferred ethoxylated fatty acid is stearic acid ethoxylated with about 6–10 moles of ethylene oxide.

The alkoxylated glycol lubricants are of the type shown in formula (VIII):

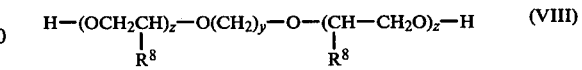

wherein $R^8$ is hydrogen or methyl; y is an integer of 2to 4, and z is an integer sufficient to provide a molecular weight of about 250 to 1000. The glycols may be alkoxylated using ethylene oxide, propylene oxide, or mixtures thereof. Glycols include ethylene glycol, propylene glycol, and butylene glycol.

More preferably, the polymer mixture is spun, using as the lubricant an aqueous solution (about 15%) of (1)polyoxyethylene (6–10 moles) stearate or (2) alkoxylated (50/50 ethylene/propylene oxide) ethylene glycol (mol wt about 250). The spun, drawn yarns are then exposed to a xenon arc lamp.

In the following non-limiting examples all parts and percents are by weight unless otherwise specified.

EXAMPLE 1

A solution of 4,4'-(hexamethylenediimino)bis(2,2,6,6-tetramethylpiperidine) (12.0 grams; 0.0305 mole) and sodium carbonate (6.4 grams; 0.06 mole) in warm water (300 mls) is cooled to 40–45° C. A solution of 1,3-benzenedisulfonyl chloride (8.2 grams; 0.03 mole) in methylene chloride (200 mls) is added in one portion to the aqueous solution in a Waring Blender and the resulting mixture is stirred therein for 10 minutes. The reaction mixture is then allowed to settle and the organic layer is separated, dried over anhydrous magnesium sulfate and filtered. The filtrate is then concentrated under vacuum to obtain 8.0 grams of a pale amber-colored solid, m.p. 125–130° C., which has a number average molecular weight of 1773, corresponding to an n value of about 3.

EXAMPLE 2

A mixture of 1,3-benzenedisulfonyl chloride (2.75 grams; 0.01 mole), 4,4'-hexamethylenediimino)-bis(2,2,6,6-tetramethylpiperidine) (3.9 grams; 0.01 mole), and powdered sodium hydroxide (0.8 gram; 0.02mole) is refluxed in toluene (50 mls) for 24 hours. After removing by-product sodium chloride by filtration, the filtrate is heated under vacuum to evaporate the solvent and obtain a gum which is dried in a vacuum oven at 60° C.

EXAMPLE 3

The procedure of Example 2 is followed except that after refluxing in toluene for 24 hours n-butylamine (1.0 gram; 0.01 mole) is added to the reaction mixture and refluxing is continued for 8 more hours. After removing insolubles by filtration, the filtrate is heated under a vacuum to evaporate the solvent and obtain a gum which is dried in a vacuum oven at 60° C.

EXAMPLE 4

Testing in Polypropylene

The product of Example 1 (0.25 gram) is dry blended with a mastermix of 100 grams of unstabilized polypropylene (Pro-fax ® 6401) and 0.1 gram of a processing antioxidant, 2,4,6-tri-t-butylphenol. The blend is milled on a two-roll mill at 350–370° F. for five minutes, and then compression molded at 400° F. into a film 4–5 mils thick. The film and a control film, identically prepared without the compound under test, are exposed to a xenon arc in an Atlas Weather-Ometer ® until they fail. A film is considered as having failed when the carbonyl content of the infrared absorption spectrum increases by 0.10- weight percent, a generally accepted point of film embrittlement.

The data in Table 1 show the number of hours required to increase the carbonyl content by 0.1% by weight for the compound under test and a control film.

TABLE I

| Example | Additive | Hours to Failure |
| --- | --- | --- |
| 4 | Product of Example 1 | 800 |
|  | None |  |

EXAMPLE 5

In the manner of Example 4, substituting the product of Example 3 for the product of Example 1, similar results are obtained.

What is claimed is:

1. An oligomer of the formula (I)

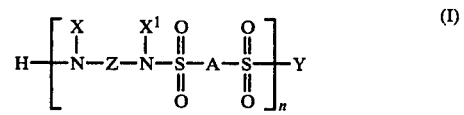

wherein X and $X^1$ are the same or different, and represent hydrogen, $C_1$–$C_{20}$ alkyl, or the radical (II)

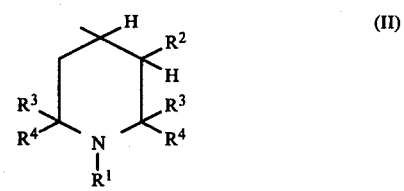

wherein $R^1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, which may be the same, or different, represent $C_1$–$C_8$ alkyl, benzyl, or phenethyl, or together with the carbon to which they are attached form a $C_5$–$C_{10}$ cycloalkyl, Z represents $C_2$–$C_{20}$ alkylene, either straight-chained or branched, wherein the alkylene chain may be interrupted by oxy, thio, or

radicals, wherein $R^5$ represents hydrogen, $C_1$–$C_{20}$ alkyl, or the radical (II); $C_5$–$C_{10}$ cycloalkylene

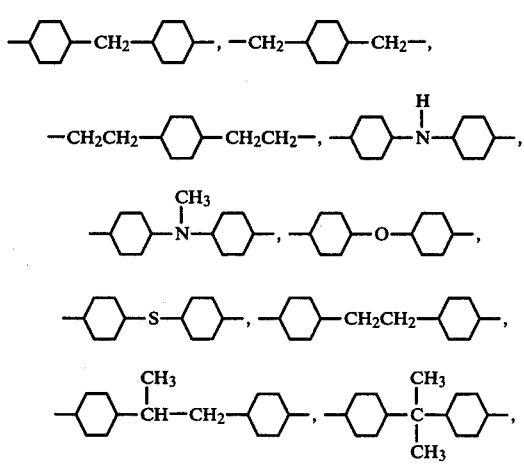

-continued

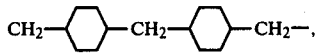

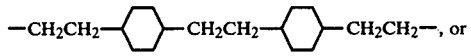

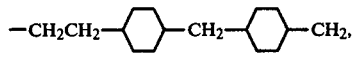

$C_6$–$C_{12}$ arylene, or $C_8$–$C_{16}$ aralkylene,

A is a $C_6$–$C_{12}$ arylene radical, or a substituted $C_6$–$C_{12}$ arylene wherein the substitutents, which may be the same, or different, are $C_1$–$C_8$ alkyl, $C_1$–$C_8$ alkoxy, $C_1$–$C_8$ alkylamino, or di($C_1$–$C_8$)alkylamino, n is an integer greater than 1 and less than 5, And, Y represents halo, $C_1$–$C_8$ alkylamino, di($C_1$–$C_8$)alkylamino, piperidyl, pyrrolidyl, morpholino, or

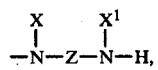

wherein X, $X^1$, and Z are as previously defined; with the proviso that at least one piperidinyl moiety of formula (II) is present in the repeating unit.

2. The oligomer of claim 1 wherein X and X' are the radical (II).

3. The oligomer of claim 1 wherein X and X' are 2,2,6,6-tetramethyl-4-piperidinyl.

4. The oligomer of claim 1 or 3 wherein Z is hexamethylene and A is 1,3-phenylene.

5. The oligomer of claim 1 further reacted with an alkyl or aryl amine.

6. The oligomer of claim 5 wherein said amine is n-butylamine.

7. A method for stabilizing a polymer subject to degradation by ultraviolet radiation which comprises incorporating into said polymer an ultraviolet radiation stabilizingly effective amount of an oligomer of claim 1.

8. The method of claim 7 wherein the oligomer is incorporated in a concentration of from about 0.2 to 2% by weight based on the polymer.

9. The method of claim 7 wherein the polymer is a polyolefin.

10. The method of claim 9 wherein the polyolefin is polypropylene.

11. The method of claim 7 wherein the oligomer is that of claim 2.

12. The composition produced by the method of claim 7.

13. The composition produced by the method of claim 11.

* * * * *